United States Patent [19]

Lancaster

[11] Patent Number: 4,541,481

[45] Date of Patent: Sep. 17, 1985

[54] ANNULAR ELECTRICAL CONTACT APPARATUS FOR USE IN DRILL STEM TESTING

[75] Inventor: Charles E. Lancaster, Houston, Tex.

[73] Assignee: Schlumberger Technology Corporation, New York, N.Y.

[21] Appl. No.: 549,527

[22] Filed: Nov. 4, 1983

[51] Int. Cl.$^{4}$ .................. G01V 1/40

[52] U.S. Cl. .................. 166/65.1; 166/66; 340/856; 367/82

[58] Field of Search .................. 166/250, 65 R, 66; 340/856; 367/82

[56] References Cited

U.S. PATENT DOCUMENTS

| | | | |
|---|---|---|---|
| 2,380,520 | 7/1945 | Hassler | 367/82 |
| 3,805,606 | 4/1974 | Stelzer et al. | 367/82 |
| 3,876,972 | 4/1975 | Garrett | 367/82 |
| 4,051,456 | 9/1977 | Heilhecker et al. | 340/856 |

*Primary Examiner*—Stephen J. Novosad

*Assistant Examiner*—William P. Neuder

[57] ABSTRACT

In accordance with an illustrative embodiment of the present invention, a full bore drill stem testing system includes a tubular housing suspended in a well on a pipe string and having an open bore therethrough. An annular electrical contact sleeve is mounted on the wall of the housing surrounding the bore. A running tool that is lowered into the pipe string on electrical wireline includes inner and outer body members, with the outer body member carrying latch dogs that engage a shoulder in the housing to stop downward movement in a predetermined position. The inner body member carries a normally retracted annular elastomer element that has an electrical contact means on its outer periphery, and expander means responsive to upward movement of said inner body member relative to said outer body member is operable to expand the elastomer element to cause the contact means to engage the contact sleeve and enable drill stem test data to be transmitted to the surface via the electric wireline.

7 Claims, 8 Drawing Figures

Fig. 3 B
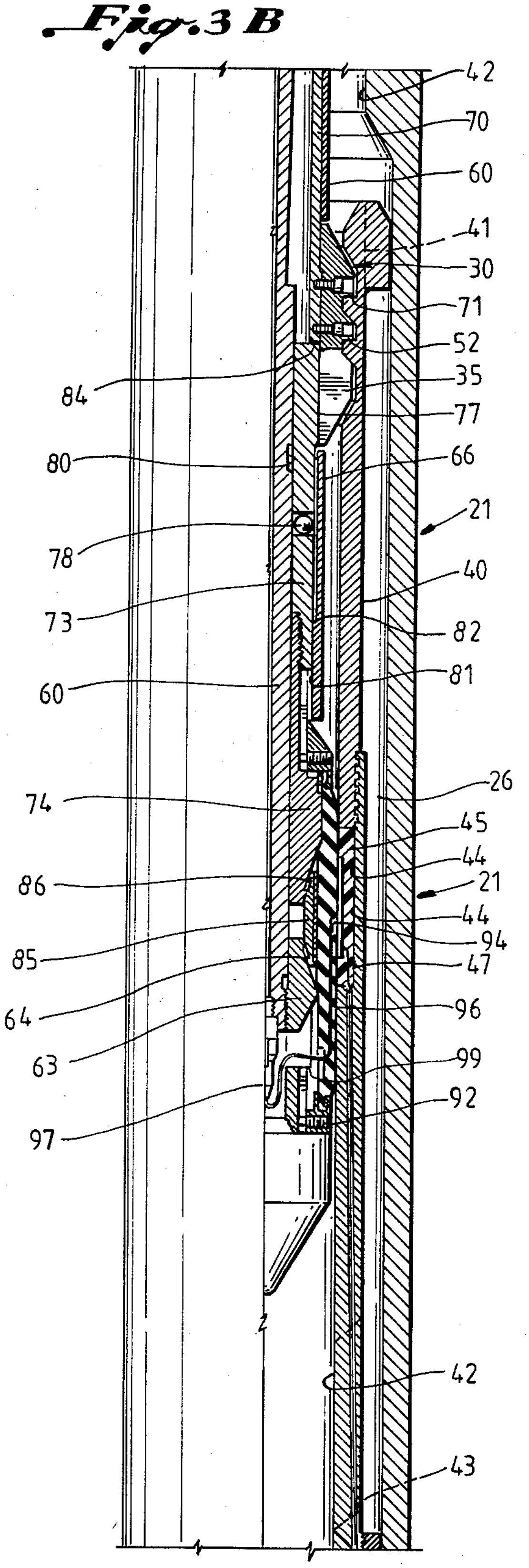
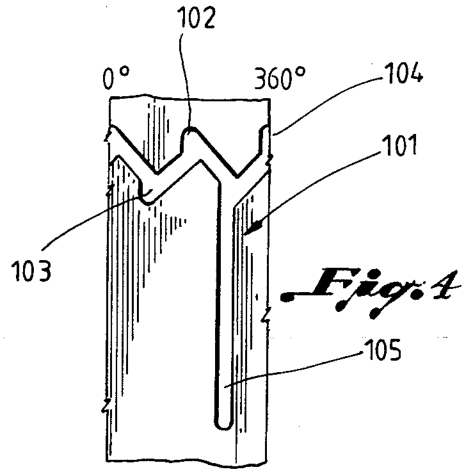
Fig. 4
Fig. 5
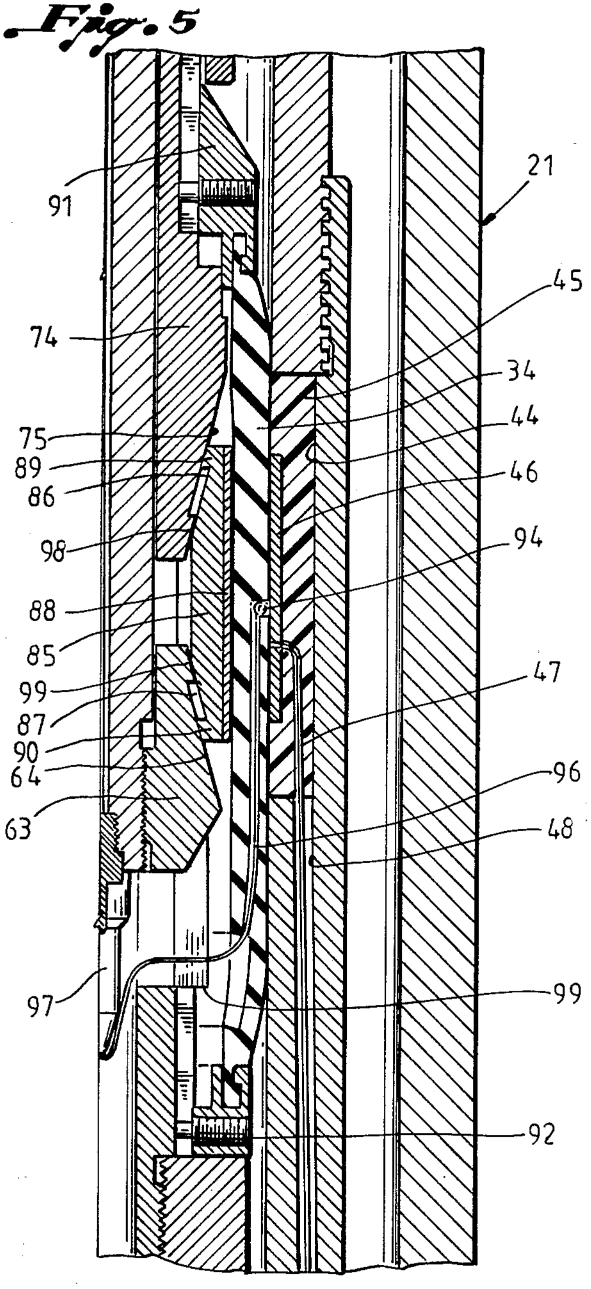

ANNULAR ELECTRICAL CONTACT APPARATUS FOR USE IN DRILL STEM TESTING

FIELD OF THE INVENTION

This invention relates generally to full bore drill stem testing apparatus including means enabling readout at the surface of measurements made downhole while the test is in progress, and particularly to a new and improved electrical connector apparatus that can be run into the drill pipe on wire line and then actuated to make an electrical connection with a recording gauge in a full bore test tool to permit data to be transmitted to the surface.

BACKGROUND OF THE INVENTION

In drill stem testing where a temporary completion is made of an earth formation interval that has been intersected by a well bore, it is desirable to use "full-bore" test tools that are constructed in a manner to provide straight vertical access through the tools so that various wireline devices such as perforating guns and the like can be run without removing the equipment from the well. In accordance with typical drill stem testing practice, a packer and a normally closed test valve are lowered into the well bore on a pipe string, and the packer is set to isolate the interval to be tested from the hydrostatic head of fluid in the well thereabove. The test valve, which may be a ball or flapper valve, is opened to draw down the pressure in the interval so that cognate formation fluids will enter the well bore, and then the valve is closed to permit the pressure of fluids to build-up while measurements are made as a function of time and are recorded on a gauge. The data is, of course, of considerable value in connection with subsequent completion decisions as will be recognized by those skilled in the art.

A readout of the data at the surface as the test proceeds is highly desirable from the standpoint of being able to optimize the durations of the flow and shut-in periods, as well as to continuously monitor downhole tool performance. Transmission of the data to the surface generally requires that an electric wireline be positioned in the pipe string, and an electrical connection made with an output terminal in the tool string. When the data has been transmitted, the connection is released so that the wireline can be removed from the pipe string prior to removal of the test tools from the well.

An apparatus for use in making an electrical connection in a full-bore test tool string is disclosed in U.S. application Ser. No. 422,246, Guidry et al, assigned to the assignee of this invention. This structure, while being basically sound in concept, is considered to have a number of disadvantages. The arms of the running tool extend upwardly on the body, and are susceptible to getting stuck in the pipe string should they accidentally open up as the tool is being withdrawn therefrom. Thus it is possible that the arms could be broken off and dropped into the pipe, which would require a time consuming and somewhat expensive fishing job for their removal. Also, a fairly precise degree of alignment of the arms is required to make proper electrical contact, in the absence of which the male pins employed in the system can be bent and cause shorting or other malfunction. Moreover, the apparatus described in the application may be considered to be structurally complicated and somewhat unreliable in operation.

It is accordingly the general object of the present invention to provide a new and improved electrical connector apparatus useful in drill stem testing with full bore testing tools.

Another object of the present invention is to provide a new and improved apparatus of the type described which does not require precise alignment in order to make proper electrical contact.

Yet another object of the present invention is to provide a new and improved electrical connector apparatus of the type described which is less complicated, and more reliable in operation, than prior devices.

SUMMARY OF THE INVENTION

These and other objects are attained in accordance with the concepts of the present invention through the provision of a connector running tool apparatus that can be lowered into the well on wireline and positioned within the housing of a well testing tool. The apparatus then is actuated in response to manipulation of the wireline to cause an electrical connection to be made so that test data that is stored in a recording gauge in the test tool can be transmitted to the surface. An electrical contact sleeve is mounted on an inner wall of the test tool housing and surrounds the bore therethrough, and a fluid bypass is provided in the housing to permit the flow of well fluids past the contact sleeve. A locator profile is formed in the housing to enable selective positioning of the running tool with respect to the contact sleeve.

The running tool includes an inner body structure that is connected to the wireline which extends upwardly to the surface, and an outer body structure that is moveable longitudinally with respect thereto. The outer body structure carries latch dogs which have outer profiles that mate with the profile in the housing to stop downward movement. A normally retracted annular elastomer element is mounted on the inner body structure and has an electrical contact means on the outer periphery thereof. An expander means that is responsive to telescoping movement of the body structures is operable to cause expansion of the annular elastomer member in order to bring the contact means into engagement with the contact sleeve on the housing. The elastomer element also is expanded in a manner such that regions thereof above and below the contact means engage adjacent surfaces on the housing to seal off the area of contact from well fluids. With an electrical connection thus made, the data stored in the gauge can be transmitted to the surface via the wireline and read out at the surface, so that such data is available during the testing process.

Telescoping movement of the inner and outer body structures is caused in response to a strain taken in the wireline at the surface. When the strain is relieved, the annular elastomer element, and the contact means carried thereby, are retracted to their relaxed condition as the inner body member moves relatively downward. Then the running tool can be removed from the pipe. Since the electrical contacts of the present invention are annular in shape, rotational orientation to obtain precise alignment is not required for proper operation, and there are no pivotally mounted parts or the like that might be accidentally broken off in the well. The apparatus of the present invention is relatively simple in construction, and is believed to be more reliable in operation than prior devices.

BRIEF DESCRIPTION OF THE DRAWINGS

The present invention has other objects, features and advantages which will become more clearly apparent in connection with the following detailed description of a preferred embodiment, taken in conjunction with the appended drawings, in which:

FIGS. 3A and 3B are views similar to FIG. 2 but showing the parts in their relative positions when the latch dogs are locked and the annular contact is in its expanded position;

FIG. 4 is a developed plan view of a jay-slot and pin arrangement used to control relative longitudinal movement between the body members of the present invention; and FIG. 5 is an enlarged fragmentary view of the expanded annular contact in engagement with the contact sleeve on the housing.

DETAILED DESCRIPTION OF A PREFERRED EMBODIMENT

Figure 1:
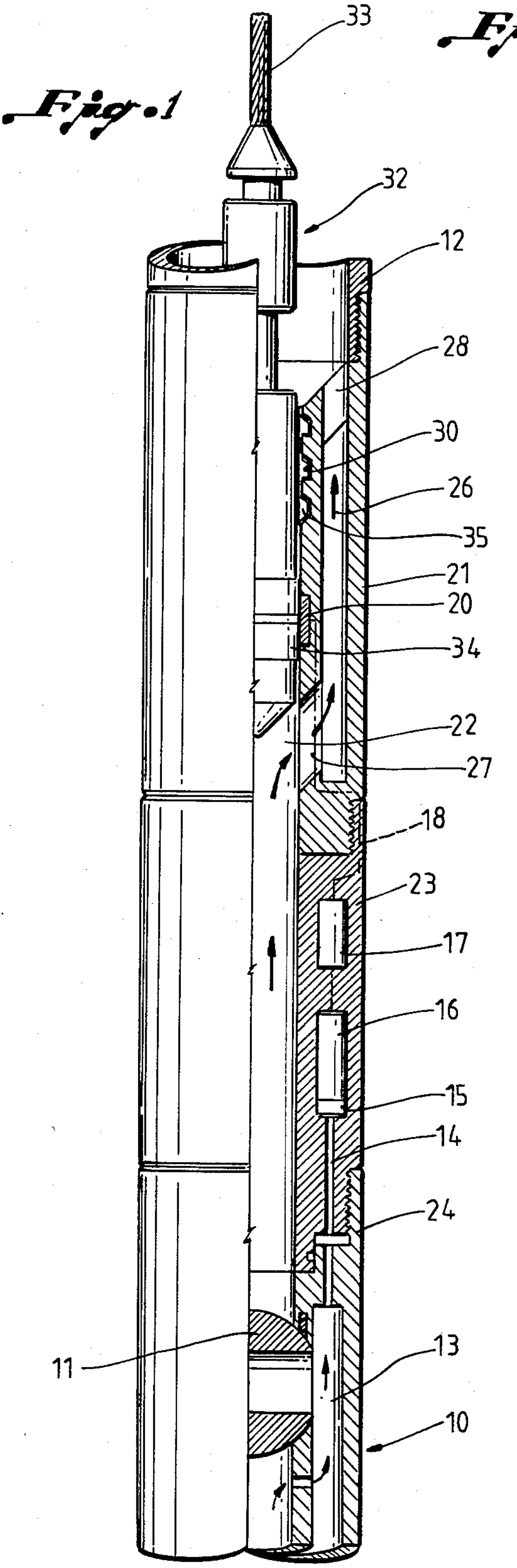
FIG. 1 is a somewhat schematic view of a well testing apparatus that incorporates the present invention.

Referring initially to FIG. 1, there is shown schematically a drill stem testing apparatus including a main test valve assembly 10 having a ball valve element 11 that can be rotated from its normally closed position, as shown, to an open position to permit fluids from the formation to flow up into the pipe string 12 which extends upwardly to the surface. Then the ball valve 11 is closed to shut in the formation to enable recording by a pressure gauge of pressure build-up data which, as discussed above, is of considerable value. Of course, the tester valve 10 is connected to a packer (not shown) which can be set to isolate the formation interval being tested. The valve 10, as well as other devices such as reversing valves which typically are included in the tool string, preferably are arranged to be activated in response to changes in pressure of fluids in the well annulus above the packer. Other components of the tool string such as safety joints and jars may be included but are not shown in order to simplify the disclosure.

When the ball valve 11 is closed as shown, formation pressure is directed to a location above the valve via a passage 13 and ports 14 to a transducer 15 which senses pressure values and provides an output that is stored in a recording gauge 16 which is powered by a battery 17. The output of the gauge 16 is fed by a conductor wire 18 to an electrical contact ring 20 which is mounted on the inner wall of the housing 21 and surrounds the bore 22 therethrough. The housing 21, which is generally tubular in form, is threaded to the upper end of a transducer sub 23 which is threaded to the upper end of the tester valve housing 24. As shown in the drawing FIG. 1, the housing 21 and the sub 23 each have a bore that provides an open axial path through the center of the tool string to provide a full-bore arrangement as will be apparent to those skilled in the art.

By way of further general description, it will be noted that the housing 21 is provided with a bypass passageway 26 that extends between ports 27 and 28 so that production fluids can flow externally of the contact sleeve 20 while the running tool 32 is in position within the housing. An annular recess arrangement provides a profile 30 on the interior walls of the housing 21 above the contact ring 20. A contact running tool indicated generally at 32 which can be suspended in the pipe 12 on electric wireline 33 is shown positioned within the bore of the housing 21. The tool 32 carries an expansible electrical contact means 34 which can be engaged with the contact sleeve 20 to complete an electrical circuit that enables signals representative of data stored in the recording gauge 16 to be transmitted via the wireline 33 to the surface. The tool 32 is located in a selected position within the housing 21 by latch dogs 35 that have external profiles shaped to match the profile 30 on the housing so as to be stopped thereby during downward movement.

Figure 2A:
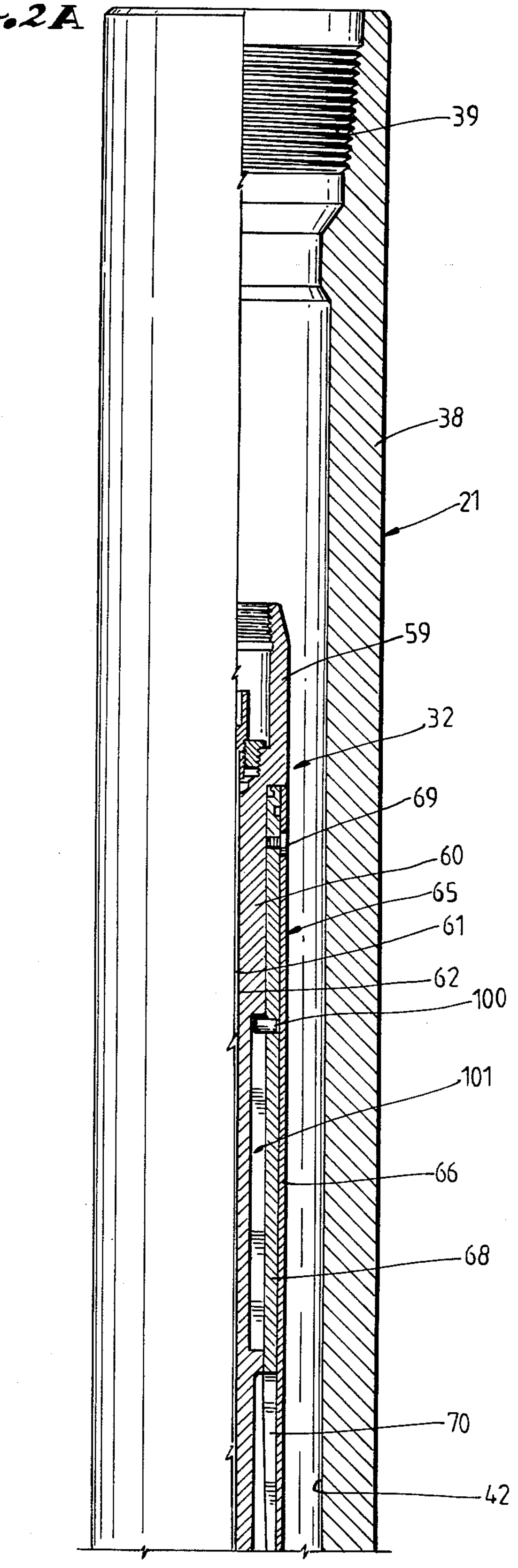
FIGS. 2A–2C are longitudinal sectional views, with portions in side elevation, of the contact running tool positioned and stopped inside the tester housing but prior to expansion of the annular contact.
Figure 2B:
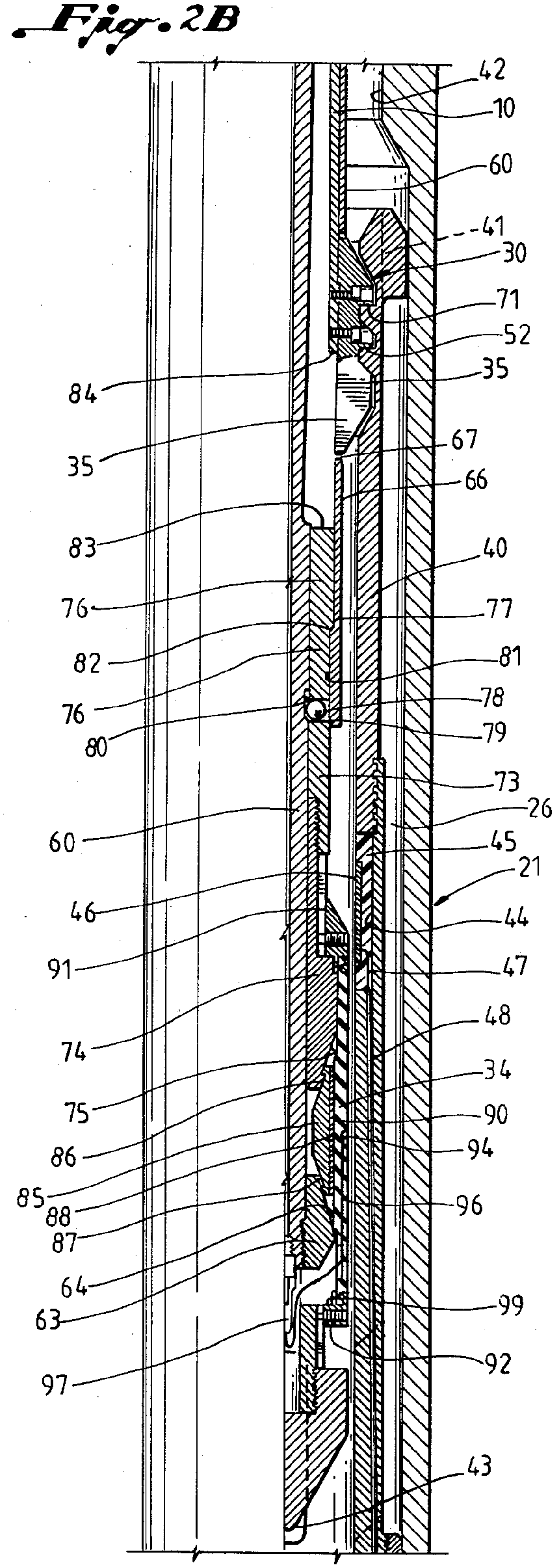
Figure 2C:
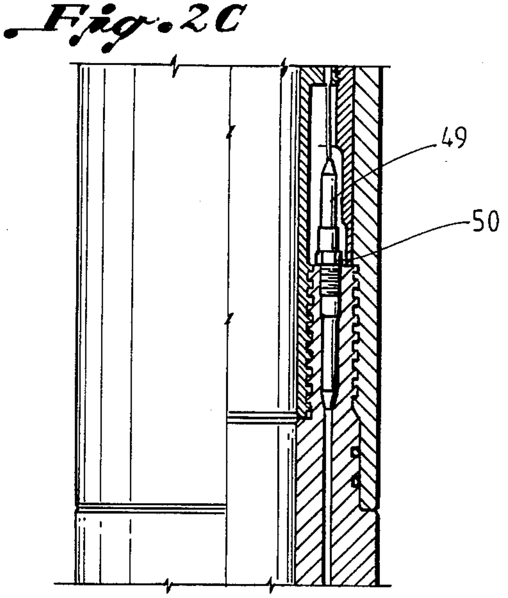
Figure 3A:
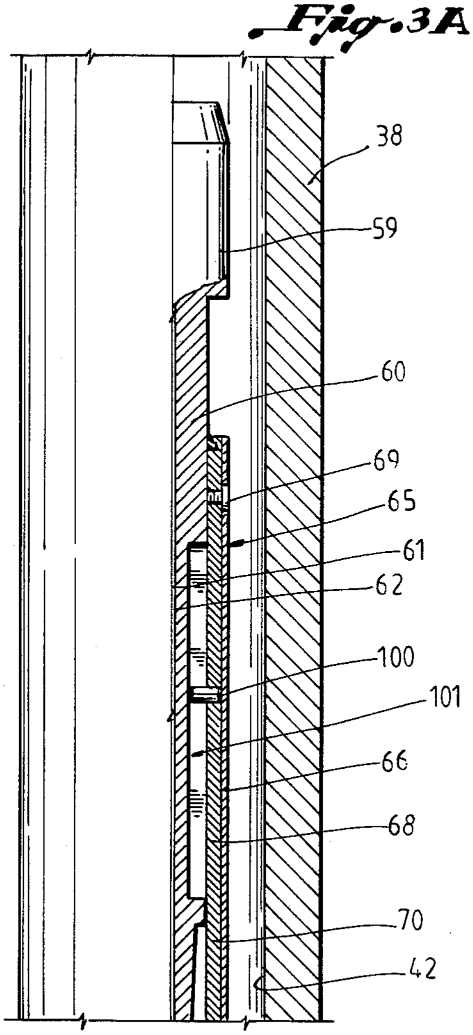

Turning now to FIGS. 2A–2C for a more detailed description of the structural arrangement of the present invention, the housing 21 includes an outer member 38 having threads 39 at its upper end for connection to the pipe string thereabove. An inner member 40 (FIG. 2B) is fixed at its lower end to the outer member 38 and is inwardly spaced with respect thereto to provide the bypass passageway 26. The upper end of the inner member 40 may be enlarged as shown and provided with flow slots 41 that communicate the upper end of the bypass 26 with the central bore 42 of the housing, and one or more ports 43 at the lower end of the inner member 40 communicate the lower end of the bypass 26 with the central bore 42. An internal annular recess 44 on the inner body member 40 receives an insulator sleeve 45 made of a suitable nonconducting material, and an electrical contact sleeve 46 is mounted on the inside of the insulator sleeve. A conductor wire 47 leads from the sleeve 46 through a bore 48 in the inner housing member 40 to a female connector element 49 (FIG. 2C) which mates with a male feed-through connector 50 that eventually is connected to an output terminal of the gauge 16.

The profile 30 is formed by a series of recesses in the inner wall of the upper end portion of the housing member 40. The recesses define upwardly facing shoulders 52 which provide stops when engaged by downwardly facing shoulders on the latch dogs 35. The shoulders as well as the recesses formed above and below them provide a distinctive shape that is matched by the exterior configuration of the dogs 35 to cause the tool to be selectively stopped at the proper location within the housing 21. Cooperating cam surfaces are provided at the upper end of the housing profile 30 and on the upper and lower faces of the dogs 35 to enable the dogs to be engaged with, and released from, the profile. The dogs 35 are mounted on the lower end of flexible arms 70 in a manner to be described in more detail herebelow.

As shown in FIG. 2A, the running tool 32 includes an inner body member 60 that is coupled by an adapter 59 at its upper end to a socket (not shown) on the lower end of the wireline 33. The body member 60 has a small bore 61 that extends axially throughout its length and which receives a conductor wire 62 that is coupled to a conductor in the wireline. A lower expander member 63 having an upwardly and inwardly inclined external surface 64 is threadedly fixed to the lower end of the body member 60 as shown in FIG. 2B, and the expander member may be connected to a nose piece that forms the lower end of the tool. The upper end portion of the body member 60 is enlarged somewhat in diameter and has a jay-slot arrangement formed on the exterior thereof to provide control over longitudinal relative movement in a manner to be described below.

An outer body structure 65 is slidably received on the inner body member 60, and includes a tube 66 having a plurality of circumferentially spaced windows 67 formed through the wall thereof. A sleeve 68 that is fixed to the inside of the tube 66 by a screw 69 or the like has its lower portion divided into a plurality of circumferentially spaced, downwardly extending spring arms 70 by slots that extend upwardly from its lower end, and the lower end of each spring arm carries a latch dog 35 that extends through a respective window 67. The latch dogs 35 each have a profile machined on the outer face thereof that includes downwardly facing shoulders 71 with recesses therebetween that provide a configuration which matches the profile 30 in the housing 21 so that when the dogs reach the profile 30 they will resile outwardly into engagement therewith in order to stop downward movement.

A sleeve 73 that is slidably mounted on a lower portion of the inner body member 60 has an upper expander member 74 fixed to its lower end, the member 74 having a downwardly and inwardly inclined external surface 75. The upper portion 76 of the sleeve 73 is somewhat enlarged in diameter to provide an annular locking surface 77, and a plurality of detent balls 78 are received in holes 79 that extend through the wall of the sleeve. In the running position of the tool as shown in FIG. 2, the balls 78 are held in engagement with a groove 80 on the outer periphery of the body member 60 by an inner annular wall surface 81 on the lower end portion of the tube 66. The diameters of the parts are sized such that during initial upward movement of the body member 60 relative to the outer body section 65 after the latch dogs have been engaged with the housing profile, the detent balls 78 cause the expander sleeve 73 to move upwardly therewith until the locking surface 77 is positioned behind the latch dogs 35 in order to lock them in engagement with profile 30 on the housing 21. When the detent balls 78 have been elevated to a position above a shoulder 82 on the tube 66, the balls can shift outwardly into the larger diameter space provided above the shoulder 82, and are thereby released from the groove 80. The expander sleeve 73 is elevated further in response to upward movement of the body member 60 until the upper end surface 83 of the sleeve abuts against the lower end faces 84 of the spring arms 70 which provide a stop. Further upward movement of the inner body member 60 will then advance the lower expander member 63 toward the upper expander member 74.

A plurality of arcuate segments 85 each having upper and lower inner inclined surfaces 86, 87 are mounted between the expander members 63 and 74 and are encircled by sleeve 88. The sleeve 88 is split along its length so that it can expand and contract. The annular elastomer element 34 surrounds the expander members 63, 74, and has an inner surface which fits over the sleeve 88. The upper end of the elastomer element 34 is coupled to a guide ring 91, and the lower end is coupled to another guide ring 92. Each guide ring can be provided with pins which extend into vertical slots in order to prevent relative rotation. An annular electrical contact 94, which may take the form of a coil spring, is received in a recess in the exterior surface of the element 34. The contact 94 is connected by an insulated wire 96 and an electrical connector 97 to the conductor wire 62 in the center of the body member 60. As the lower expander member 63 is moved upwardly toward the upper expander member 74, the segments 85 and the sleeve 88 are expanded radially outward to cause the central region of the elastomer element 34 to be expanded and thereby bring the resilient contact element 94 into engagement with the contact ring 46 on the housing 21. Also, peripheral regions of the elastomer element 34 above and below the contact member 94 are pressed firmly against the adjacent portions of the insulator sleeve 45 in order to isolate the contact member from well fluids. If desired, a plurality of vertically spaced annular ribs (not shown) may be formed on the exterior of the element 34 above and below the contact member 94 to enhance the isolation from well fluids.

As shown in FIG. 5, each of the segments 85 is provided with an inwardly projecting shoulder 89 at the upper end thereof and an inwardly projecting shoulder 90 at the lower end thereof. The shoulders 89, 90 slidably engage the respective inclined surfaces 75 and 64 of the expander members 74 and 63. In a similar manner, an outwardly projecting shoulder 98 is provided on the lower end portion of the upper expander member 74, and another outwardly projecting shoulder 99 is formed on the upper end portion of the lower expander member 63. The shoulders 98 and 99 slidably engage the respective inclined surfaces 86 and 87 on the segments 85. As the lower expander member 63 is moved downward from the position shown in FIG. 5 to permit retraction of the segments 85 and the elastomer element 34, the respective sets of shoulders 99, 90 and 98, 89 are brought into engagement with one another to produce a centering of the segments which prevents jamming thereof within the elastomer element.

In order to provide control over relative longitudinal movement between the inner body member 60 and the outer body structure 65, a pin 100 (FIG. 2A) that is fixed to the sleeve 68 extends into a jay-slot arrangement 101 formed in the outer periphery of the upper portion of the body member 60. The jay-slot arrangement 101, shown in developed plan view in FIG. 4, includes a pair of upper pockets 102 and 104, a lower pocket 103 and an elongated slot 105 that are angularly spaced and interconnected by inclined channels as shown. As the apparatus is being lowered into the drill pipe, the pin 100 is positioned in the pocket 104, and the expander members 74 and 63 are spaced apart so that the elastomer element 34 is in its normally retracted position. When the apparatus has been lowered into the bore of the housing 21 and the latch dogs 35 have engaged the profile 30, the body member 60 is raised by pulling upwardly on the wireline 33. The pin 100 automatically traverses the inclined channel that leads to the elongated slot 105 which permits a substantial amount of upward relative movement of the body member 60 to occur during engagement of the electrical contacts as previously described. When it is desired to remove the running tool apparatus from the pipe, the body section 60 is first lowered to cause pin 100 to automatically enter the slot 102, and then is raised to cause the pin to automatically enter the slot 103. The pin 100 remains captured in the slot 103 to prevent downward relative movement of the outer body structure 65 as the apparatus is removed from the well.

OPERATION

In operation, the test tool string is run into the well and the packer is set by appropriate manipulation of pipe 12 to isolate the well interval to be tested. The ball valve 11 is moved to open position in response to the application of pressure at the surface to the well annulus, and the valve is left open for a flow period of time that is sufficient to draw down the pressure in the isolated interval. When the applied pressure is released, the valve 11 closes to shut in the test interval. As the test valve 11 is operated, pressure data that is sensed by the transducer 15 is recorded by the gauge 16, and of course the valve can be repeatedly opened and closed to obtain additional test data. The annular electrical contact apparatus of the present invention enables such data to be read out at the surface on a real time basis, or data previously obtained and stored in the gauge can be transmitted. Of course, it also is possible to transmit recorded data and real time measurements sequentially.

To obtain a surface read out of the data stored in the gauge 16, the running tool apparatus 32 is attached to the electric wireline 33 and lowered into the pipe string 12. The outer body structure 65 of the tool initially is stationed in an upper position with respect to the inner body member 60, so that the expander members 74 and 63 are spaced apart, and the elastomer element 34 is retracted. When the latch dogs 35 reach the upper end of the inner housing member 40, they are cammed inwardly against the bias force afforded by the cantilevered spring arms 70, and enter the profile area where the shoulders 71 abut the shoulders 52 and stop downward movement of the running tool apparatus. At this point the elastomer element 34 is located somewhat below the contact ring 46 as shown in FIG. 2B. Then the inner body member 60 is raised by pulling upwardly on the wireline 33. The detent balls 78 cause the expander sleeve 73 to be raised therewith to bring the locking surface 77 into position behind the latch dogs 35. After the detent balls 78 have cleared the shoulder 82 and are free to move outwardly, the expander sleeve 73 continues to move upwardly with the body member 60 until the upper surface 83 engages the stop surface 84.

With the expander sleeve 73 held stationary by the locked engagement of the latch dogs 35 with the profile 30, a strain is taken on the wireline 33 to cause the lower expander member 63 to be advanced toward the upper expander member 74. This causes the segments 85 and the split sleeve 88 to be forced radially outward to produce an expansion of the central region of the elastomer element 34 as shown in greater detail in FIG. 5. The coil spring contact 94 is expanded into engagement with the contact ring 46 to complete an electrical circuit between the wireline 33 and the recording gauge 16. Outer surfaces of the elastomer element 34 located above and below the spring contact 94 are forced into engagement with the non-conductive sleeve 45 in order to isolate the contacts from the well fluids and prevent shorting. A strain is maintained on the wireline 33 during the time that readings are being transmitted from the gauge 16 to the surface. When the running tool is in place within the housing 21, any fluid flow in the upward direction through the housing can bypass the contact running tool via the ports 43 and 41 and the annular space 26.

To release the running tool apparatus 32 so that it can be removed from the pipe, the strain on the wireline 33 is released so that the inner body member 60 can be shifted downwardly to move the lower expander member 63 downwardly with respect to the upper expander member 74. This enables the segments 85 to shift inwardly and relieve the outward pressure on the central region of the elastomer element 34. The element 34 will inherently retract to its normal or relaxed diameter and thereby disengage the contacts 94, 46. As the lower expander member 63 moves downwardly, the shoulder 99 drives the end ring 92, and the upper ring 91 causes the upper expander sleeve 73 to move downwardly therewith. It should be noted that as the sleeve 73 which carries the detent balls 78 is moved downward relative to the tube 66, the balls will engage the shoulder 82 and prevent further downward movement of the upper expander member 74 unless the recess 80 on the inner body member 60 has been positioned opposite the balls to enable their inward movement. Until this occurs, the upper end portion of the locking surface 77 will continue to lock the latch dogs 35 in engaged positions. Thus, the lower expander member 63 is moved to its initial lowermost position with respect to the upper expander member 74 before the latch dogs 35 are released, which forces a full retraction of the elastomer element 34. When the locking surface 77 is removed from behind the latch dogs 35, they can be cammed inwardly and released from the profile in response to upward force. Downward movement of the body member 60 causes the pin 100 to move into the slot 102, and then as the inner body member 60 is moved upwardly the pin 100 is captured in the slot 103 to prevent resetting of the running tool. Upward strain on the wireline 33 causes the latch dogs to be pulled out of engagement with the profile 30 in the housing 21.

Although the present invention has been described in connection with an annulus pressure operated tool system that typically is used in testing offshore wells, the invention has equal application to a mechanically operated test tool system that has a full-opening main valve that is opened and closed in response to manipulation of the pipe string. Such mechanically operated test tools might be used in either inland or offshore wells.

It now will be recognized that a new and improved electrical contact running tool for use with full bore testing tools has been provided. The running tool does not require rotational orientation and precise alignment of parts in order to make an electrical connection in the well, and is believed to be less complicated and more reliable in operation than prior devices of this type. Since certain changes or modifications may be made by those skilled in the art without departing from the inventive concepts involved, it is the aim of the appended claims to cover all such changes and modifications falling within the true spirit and scope of the present invention.

What is claimed is:

1. An electrical contact running tool apparatus for use in connection with a well tester, comprising:

an inner body structure telescopically disposed within an outer body structure;

said outer body structure carrying latch means for locating said tool within the bore of an associated well tester;

normally retracted means on said inner body structure including an annular elastomer element carrying electrical contact means on the outer periphery thereof; and means responsive to telescoping movement of said body structures for expanding said elastomer element from its normally retracted position to an expanded position where said contact means engages a companion contact member on the well tester.

2. The apparatus of claim 1 wherein said expanding means comprises a lower expander member on said inner body structure, an upper expander member moveable relatively along said inner body structure above said lower expander member, and means associated with said latch means for stopping upward movement of said upper expander member to enable said lower expander member to be advanced toward said upper expander member.

3. The apparatus of claim 1 wherein said elastomer element is constituted by a sleeve having a circumferential groove in the outer periphery thereof, said contact means comprising an expandable member mounted in said groove and connected by conductor means to an electrical line by means of which said apparatus is suspended in the well.

4. The apparatus of claim 1 further including arm means on said outer body structure for mounting said latch means in a manner to enable their movement between inner and outer positions, said latch means comprising latch dogs having an outer surface profile that is shaped to match a corresponding profile in the bore of the well tester.

5. The apparatus of claim 4 further including means associated with said expanding means for locking said latch dogs in said outer positions during expansion of said elastomer element from its retracted to its expanded position.

6. Apparatus adapted for use in well testing comprising:

a tubular housing having an open bore there-through;

annular electrical contact means on a wall of said housing surrounding said bore;

fluid bypass passage means extending in said housing externally in said bore for bypassing well fluids past said contact means; and locator means in said housing for selectively positioning a running tool having an associated electrical contact means thereon within said bore in a manner such that operation of the running tool can be effected to cause engagement of said associated contact means with said annular contact means;

said locator means including recess means defining a profile having an upwardly facing stop shoulder for stopping downward movement of the running tool at a predetermined position with said bore.

7. The apparatus of claim 6 wherein said locator means is formed in the wall of said bore above said annular contact means, said bypass passage means extending from a location in communication with said bore below said contact means to a location in communication with said bore above said locator means.

* * * * *